(12) United States Patent
King

(10) Patent No.: US 7,960,857 B2
(45) Date of Patent: Jun. 14, 2011

(54) SYSTEM AND METHOD FOR VEHICLE BASED UNINTERRUPTABLE POWER SUPPLY

(75) Inventor: Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 12/326,189

(22) Filed: Dec. 2, 2008

(65) Prior Publication Data

US 2010/0133900 A1 Jun. 3, 2010

(51) Int. Cl.
*B60L 1/00* (2006.01)

(52) U.S. Cl. ...................................................... 307/10.1

(58) Field of Classification Search .................... 307/9.1, 307/10.1
See application file for complete search history.

(56) References Cited

U.S. PATENT DOCUMENTS

| | | | |
|---|---|---|---|
| 5,373,195 A | | 12/1994 | De Doncker et al. |
| 5,581,171 A | * | 12/1996 | Kerfoot et al. ................ 320/137 |
| 7,049,792 B2 | | 5/2006 | King |
| 7,053,588 B2 | * | 5/2006 | Nakanishi et al. ............ 320/104 |
| 7,301,247 B2 | * | 11/2007 | Kishibata et al. ............... 307/44 |
| 7,309,966 B2 | * | 12/2007 | Wobben ........................ 318/139 |
| 7,595,597 B2 | * | 9/2009 | King et al. .................... 318/139 |
| 7,681,676 B2 | * | 3/2010 | Kydd ......................... 180/65.21 |
| 7,732,948 B2 | * | 6/2010 | Caggiano ..................... 307/150 |

* cited by examiner

*Primary Examiner* — Michael Rutland Wallis
(74) *Attorney, Agent, or Firm* — Ziolkowski Patent Solutions Group, SC; Jean K. Testa

(57) ABSTRACT

A system and method for controlling a vehicle-based source of uninterruptable power is disclosed. The vehicle-based UPS includes an energy storage system located on-board a vehicle and configured to generate DC power transferable to an external load, and an DC-AC inverter connected to the on-board energy storage system to receive the DC power therefrom and invert the DC power to an AC power useable by the external load. The vehicle-based UPS also includes a charging device located on-board the vehicle and connected to the on-board energy storage system to provide recharging power thereto and a control system. The control system is configured to determine one of a state-of-charge (SOC) and a voltage of the energy storage system and selectively operate the charging device to provide the recharging power to the energy storage system to maintain the SOC or voltage of the energy storage system within a pre-determined range.

26 Claims, 6 Drawing Sheets

SYSTEM AND METHOD FOR VEHICLE BASED UNINTERRUPTABLE POWER SUPPLY

BACKGROUND OF THE INVENTION

The invention relates generally to an uninterruptable power supply (UPS) and, more particularly, to a vehicle-based UPS and system for controlling operation of the vehicle-based UPS.

Emergency sources of power are known as important devices in various applications and industries for providing a safeguard against power outages. It is recognized that the need for dependable and long-lasting sources of emergency power may increase in the near future as utility grid failures become more prevalent. That is, due to the number and severity of storms (lightning, wind, fallen trees, ice, etc), the overload of the country's aging utility's transmission and distribution components, and the potential threat of terrorism, the likelihood of utility grid failures is increasing.

Various types of devices are known for providing such emergency power. Devices such as a gasoline, diesel, propane, or other fueled version of an auxiliary or emergency generator are typically interfaced via a transfer switch to a subset of electrical circuits in a home to provide emergency power. An additional source of emergency power is an Uninterruptible Power Supply (UPS). An UPS is preferred in some instance to generators, as a UPS maintains a continuous supply of electric power to connected equipment by supplying power from a separate source when utility power is not available, as compared to an auxiliary power supply or a standby generator, which do not provide instant protection from a momentary power interruption as is desired for certain types of equipment. For example, a UPS is typically used to protect computers, telecommunication equipment, medical equipment, or other electrical equipment where an unexpected power disruption could cause serious business disruption or data loss, or pose other significant consequences.

It is recognized, however, that UPS systems have their limitations. A key issue with conventional UPS systems is whether the limited amount of energy that is stored in the UPS's battery is sufficient to operate the a device for an extended period of time. For example, individuals that require the use of portable AC powered medical equipment and health monitors need a backup source of power that can last for the duration of the night (depending on the specific medical equipment required) or in a worst case, for the duration of a utility grid failure. Devices such as constant pressure airway passages (CPAP), oxygen concentrators, portable respirators, and heart monitors, need to be ensured of a proper supply of power in order to ensure patient well-being. As the average age of the population increases, there is also an increasing need for such critical care devices and systems, and thereby an associated need for systems that can provide adequate, extended length powering of those devices during utility grid outages.

Therefore, it would be desirable to design a UPS system that provides extended power for external loads in the event of a utility grid failure. It is further desired that such a UPS system provide a steady power source and be maintained at a desirable state of charge (SOC)

BRIEF DESCRIPTION OF THE INVENTION

The invention is a directed method and apparatus for controlling a vehicle-based source of uninterruptable power. An on-board energy storage system, charging device and control system are provided to form a vehicle-based uninterruptable power supply (UPS). The control system selectively operates the charging device to maintain a state-of-charge (SOC) and/or voltage of the energy storage system within a pre-determined range and allow for the vehicle to provide a source of uninterruptable power.

In accordance with one aspect of the invention, a vehicle-based uninterruptable power supply (UPS) system includes an energy storage system located on-board a vehicle and configured to generate DC power transferable to an external load and an DC-AC inverter connected to the on-board energy storage system to receive the DC power therefrom and invert the DC power to an AC power useable by the external load. The vehicle-based UPS also includes a charging device located on-board the vehicle and connected to the on-board energy storage system to provide a recharging power thereto and a control system. The control system is configured to determine one of a state-of-charge (SOC) and a voltage of the energy storage system and selectively operate the charging device to provide the recharging power to the energy storage system to maintain the one of the SOC and the voltage of the energy storage system within a pre-determined range.

In accordance with another aspect of the invention, a method for supplying uninterruptable power includes the steps of detecting connection of an external load to an on-board energy storage system of a vehicle and providing power from the on-board energy storage system to the external load upon connection thereto. The method also includes the steps of detecting one of a voltage and a state of charge (SOC) of the on-board energy storage system and, if the one of the voltage and the SOC of the on-board energy storage system is below a pre-determined threshold, then activating a charging unit connected to the on-board energy storage system to supply a recharging power thereto and maintain the one of the SOC and the voltage of the on-board energy storage system within a pre-determined range.

In accordance with yet another aspect of the invention, a control system for controlling the supply of uninterruptable power from a vehicular on-board energy storage system to an external load is programmed to detect connection of an external load to an on-board energy storage system of a vehicle and measure one of a voltage and a state of charge (SOC) of the on-board energy storage system upon connection of the external load. The control system is further programmed to activate a charging device connected to the on-board energy storage system to supply a recharging power thereto if the one of the voltage and the SOC of the on-board energy storage system is outside a pre-determined range and deactivate the charging device if the one of the voltage and the SOC of the on-board energy storage system is within the pre-determined range.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are directed to systems and methods for supplying uninterruptable power to an external load from a vehicle-based power source. A propulsion system for use in a vehicle, such as a Battery Electric Vehicle (BEV), a Hybrid-Electric Vehicle (HEV), or a Plug-in Hybrid Electric Vehicle (PHEV), includes therein an on-board energy storage system with an on-board device or unit for charging the on-board energy storage system, such as an auxiliary power unit (APU) in the case of a HEV or PHEV. A control system is included in the vehicle propulsion system to control operation of the on-board energy storage system and the on-board charging device, so as to provide uninterruptable power to the external load and to maintain a voltage and/or state-of-charge (SOC) of the on-board energy storage system within an acceptable range.

Figure 1:
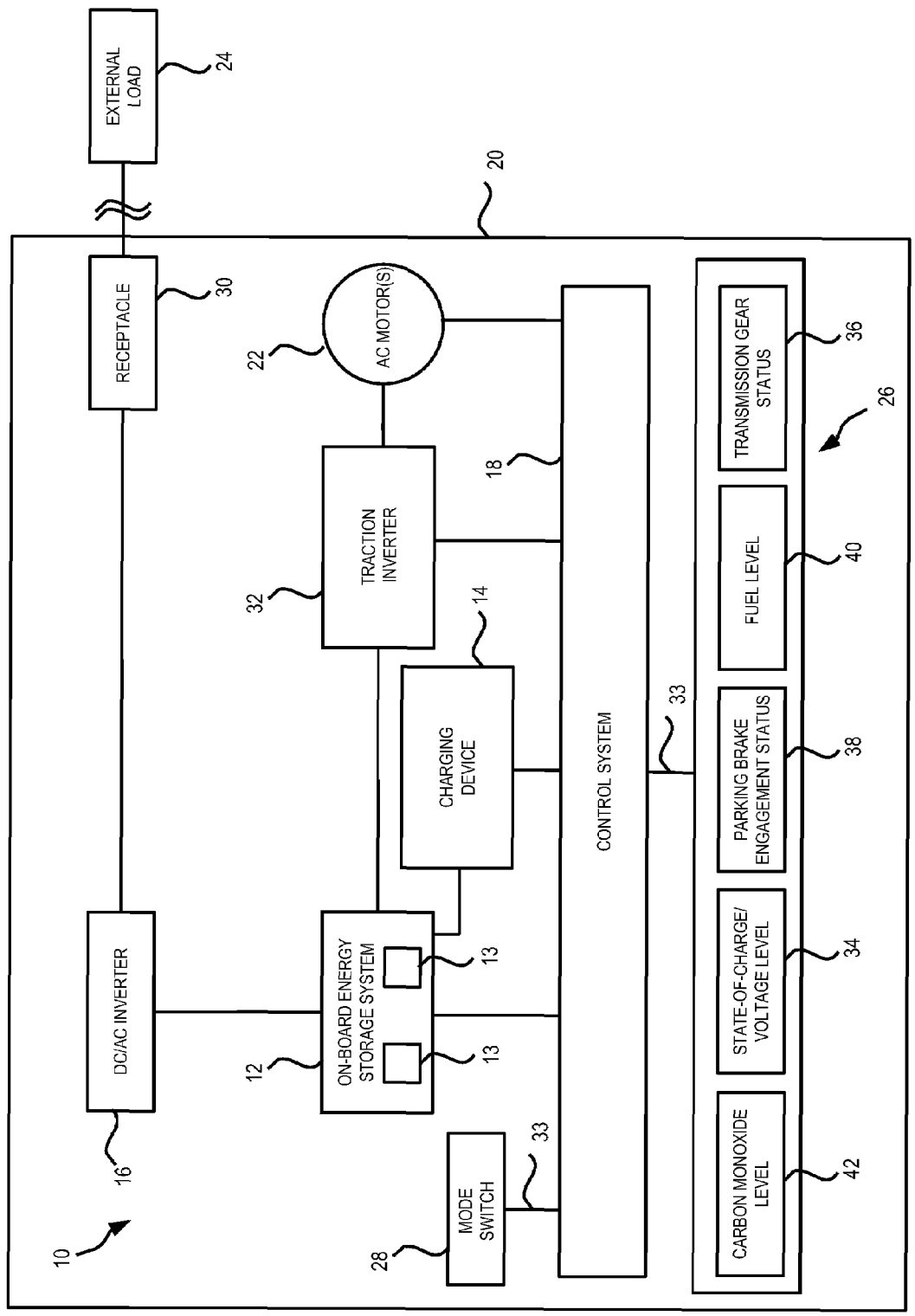
FIG. 1 is a block schematic diagram of a vehicle-based uninterruptable power supply (UPS) according to the invention.

Referring to FIG. 1, a block schematic diagram of a vehicle-based uninterruptable power supply (UPS) 10 is shown as incorporated into a vehicle propulsion system. The vehicle-based UPS 10 includes therein an on-board energy storage system 12, an on-board device or mechanism 14 for charging the on-board energy storage system 12, a DC-AC inverter 16, and a control system 18 included on a vehicle 20. The on-board energy storage system 12 includes one or more energy storage units 13 (e.g., 12 V starting-lighting-ignition (SLI) battery, traction battery, and/or hybrid traction battery arrangements), as will be described in detail below with respect to various embodiments of the invention, and is configured to provide electric power for driving one or more electric motors 22 coupled in driving relationship to wheels (not shown) of the vehicle 20 and/or provide electric power to auxiliary devices (e.g., lights, windshield wipers) on the vehicle, as well as provide a supply of uninterruptable DC power to an external load 24. The on-board charging device 14 (i.e., charging unit) is connected to the on-board energy storage system 12 to supplement power for driving the electric motor(s) 22 and/or to supply a recharging power to one or more of the energy storage units 13 in the on-board energy storage system 12. According to embodiments of the invention, when the vehicle is a HEV or PHEV, the charging device 14 can be in the form of an auxiliary power unit (APU), such as an internal combustion engine, a hydrogen fuel cell arrangement, or other similar power generating system. Alternatively, charging device 14 can be in the form of a DC-DC converter when the vehicle is a BEV. The DC-AC inverter 16 of the propulsion system for vehicle-based UPS 10 is connected to the on-board energy storage system 12 to receive the DC power therefrom and invert the DC power to an AC power useable by the external load 24. Thus, for example, DC-AC inverter 16 can be configured to receive a 12 V DC power from on-board energy storage system 12 and convert that power to a 120 V AC power (or 230 V AC power for other applications or countries) for use by the external load 24. In another example, the DC-AC inverter 16 can be configured to receive a greater than 12 V DC power from on-board energy storage system 12 and convert that power to a 120 V AC power for use by the external load 24

A control system 18 is included in vehicle-based UPS 10 and connected to each of the on-board energy storage system 12 and the on-board charging device 14. In operation, control system 18 is configured to operate on-board energy storage system 12 and on-board charging device 14 to provide controlled power to drive electric motor(s) 22 coupled in driving relationship to wheels of the vehicle 20 as part of the vehicle propulsion system (not shown). Additionally, control system 18 functions to determine a state-of-charge (SOC) and/or a voltage of the on-board energy storage system 12 and to maintain the SOC/voltage of the on-board energy storage system 12 within a pre-determined range to provide uninterruptable power to the DC-AC inverter 16 and the external load 24. To maintain the SOC/voltage of the on-board energy storage system 12, control system 18 selectively operates on-board charging device 14 to provide for a recharging power to the on-board energy storage system 12. That is, if the SOC/voltage of the on-board energy storage system 12 is determined to be within an acceptable range, then control system 18 allows vehicle-based UPS 10 to continue to supply power to the external load 24 from the on-board energy storage system 12 without activating the on-board charging device 14. If, however, the SOC/voltage of the on-board energy storage system 12 is determined to be outside of an acceptable range, then control system 18 activates charging device 14 to provide recharging power to one or more of the energy storage units 13 in the on-board energy storage system 12 to increase the SOC/voltage thereof.

As shown in FIG. 1, control system 18 includes therein inputs 33 from a sensor system 26 and from a mode switch 28. According to embodiments of the invention, mode switch 28 can be in the form of a key ignition switch or of a separate switch included in vehicle, such as a dash mounted switch. If mode switch 28 is a separate dash mounted switch, it can be configured to be alternated only between an Off mode and an Emergency Power mode. If mode switch 28 is a key ignition switch, the switch can be configured to be set to a plurality of modes to allow for different modes of operation of the vehicle, such as an Off mode, a Vehicle Accessory mode, a Vehicle Start/Run mode, and an Emergency Power mode. When the mode switch 28 is set to the Emergency Power mode, the vehicle-based UPS 10 is activated to provide power to external load 24 connected to the vehicle-based UPS by way of a plug-in receptacle 30. That is, control system 18 can selectively activate on-board charging device 14 to recharge at least one of the energy storage unit(s) 13 of the on-board energy storage system 12 to provide external load 24 with uninterruptable power. According to an embodiment of the invention, when the Emergency Power mode is selected, control system 18 further acts to deactivate motor(s) 22 and a traction inverter 32 in vehicle 20 to prevent torque generation at wheels (not shown) of the vehicle 20.

As further shown in FIG. 1, inputs 33 from sensor system 26 provide information to control system 18 on a plurality of vehicle-related parameters that control operation of the UPS 10. Sensor system 26 includes a SOC/voltage sensor 34 that measures a SOC/voltage of the on-board energy storage system 12 at various times during operation thereof. Based on a sensed SOC/voltage of the on-board energy storage system 12, control system 18 controls operation of the on-board charging device 14 to provide recharging power to the on-board energy storage system. That is, if the SOC/voltage of the on-board energy storage system 12 is outside of a pre-determined range or below a certain threshold, as measured by SOC/voltage sensor 34, control system 18 activates the charging device 14 to generate and transmit additional power to the on-board energy storage system 12. Once the SOC/ voltage of the on-board energy storage system 12 is back within an acceptable range, as measured by the SOC/voltage sensor 34, the control system 18 then deactivates the charging device 14 and continues monitoring the SOC/voltage of the on-board energy storage system 12. This cycle of measuring the SOC/voltage and activating/deactivating the charging device 14 will continue until the mode switch 28 is switched out of the "Emergency Power" mode.

Also included in sensor system 26 is a transmission gear status sensor 36 configured to provide information to the control system 18 regarding the gear (i.e., PRNDL) in which vehicle 20 is presently engaged. A parking brake engagement status sensor 38 can also be included in sensor system 26 to provide information to the control system 18 as to whether the vehicle parking brake is engaged. According to one embodiment of the invention, as another source of information to control system 18, a fuel level sensor 40 measures a level of fuel remaining for the charging device 14 (e.g., APU), such as a level of gasoline or diesel fuel remaining for an internal combustion engine. If the information provided by sensor system 26 indicates that vehicle 20 is in a "Park" gear, and/or that the parking brake is engaged, and that the fuel level is at an acceptable amount, control system 18 allows for activation of the charging device 14 as needed to maintain the SOC/voltage of the on-board energy storage system 12 within its acceptable range so as to provide a vehicle-based UPS 10 for providing power to the external load 24.

As another source of information to control system 18, a carbon monoxide (CO) sensor 42 is included in sensor system 26 that provides data regarding the level of CO in the vicinity of the vehicle 20 and whether that level is above a certain threshold limit. In the event that the CO sensor 42 detects a CO level exceeding a pre-determined threshold, or in the event that fuel level sensor 40 detects a low fuel level, control system 18 is configured to generate a command to shut down (i.e., deactivate) operation of charging device 14 (e.g., combustion engine). According to one embodiment of the invention, control system 18 can also generate an alarm based on the sensed CO level or low fuel level to alert an operator of such an occurrence. The sensor system 26 thus provides a series of information parameters to control system 18 to restrict operation of the charging device 14 when the vehicle-based UPS 10 is operating in Emergency Power mode.

Figure 2:
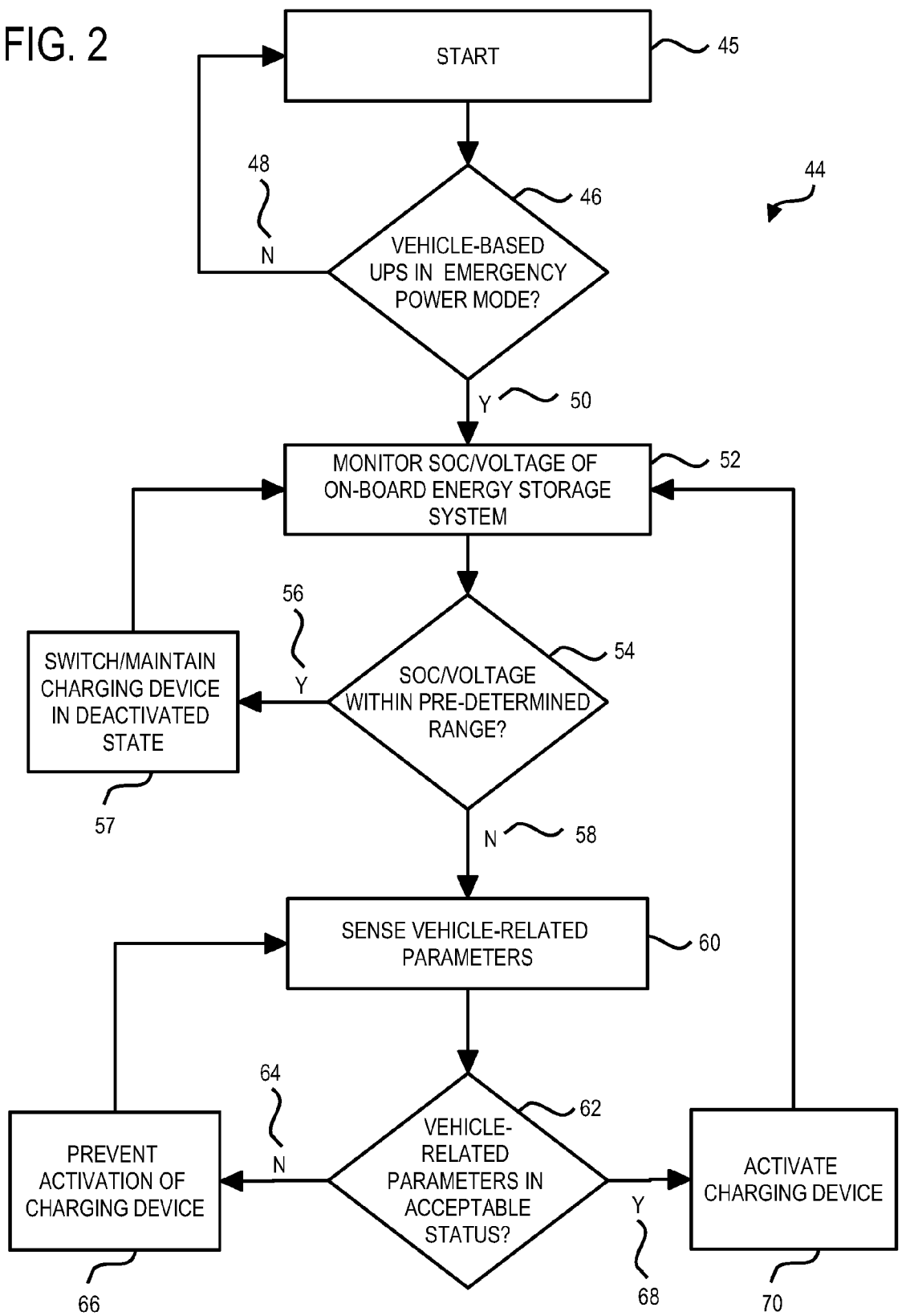
FIG. 2 is a flow diagram of a control system implemented technique for monitoring and controlling the vehicle-based UPS illustrated in FIG. 1.

Referring now to FIG. 2, a technique implemented by control system 18 to control operation of the vehicle-based UPS 10 is shown. The technique 44 initiates at STEP 45 and proceeds with a determination of whether the vehicle-based UPS is in an Emergency Power mode of operation at STEP 46. That is, a determination is made as to whether a mode switch configured to switch operational modes of the vehicle-based UPS and/or operational modes of the vehicle itself is set to an Emergency Power setting/mode. If the vehicle-based UPS is not in an Emergency Power mode 48, the technique 44 starts over. If the vehicle-based UPS is in an Emergency Power mode of operation 50, the technique 44 continues at STEP 52, where the status of the on-board energy storage system is monitored. That is, at STEP 52, a state-of-charge (SOC) and/or voltage of the specific on-board energy storage system that supplies electrical power to the DC-AC inverter is measured to determine a level of the SOC/voltage thereof.

A determination is made at STEP 54 as to whether the SOC/voltage of the on-board energy storage system is above a pre-determined threshold or within a pre-determined range. If the SOC/voltage of the on-board energy storage system is within the pre-determined range 56, the SOC/voltage of the on-board energy storage system is considered to be at an acceptable level for providing power to an external load, and no recharging of the on-board energy storage system is performed. Thus, the on-board charging device, which can comprise a DC-DC converter in an electric vehicle and/or an APU in a HEV or PHEV, is either directed to remain in a deactivated state, or caused to enter a deactivated state, at STEP 57. If, however, the SOC/voltage of the on-board energy storage system is outside the pre-determined range 58, it is determined that recharging of the on-board energy storage system by way of the charging device is desired (i.e., recharging of one or more of the energy storage units in the energy storage system). Prior to recharging of the on-board energy storage system, a plurality of vehicle-related parameters are sensed at STEP 60. According to embodiments of the invention, these vehicle-related parameters can include, but are not limited to, a transmission gear status, a parking brake engagement status, a fuel level, and a carbon monoxide (CO) level. A determination is made at STEP 62 if the vehicle-related parameters are at an acceptable status/level. For example, a determination is made if the transmission gear and parking brake are at an acceptable setting (i.e., transmission gear in "Park" and parking brake engaged), and the fuel and CO are at acceptable levels. If the vehicle-related parameters are not at an acceptable status/level 64, then activation of the charging device for recharging the on-board energy storage system is prevented at STEP 66. If the vehicle-related parameters are at an acceptable status/level 68, then the charging device (i.e., DC-DC converter or APU) is activated at STEP 70, and power generated by the charging device is transferred to one or more of the energy storage units in the on-board energy storage system to provide recharging power thereto. Upon activation of the charging device to recharge the on-board energy storage system, the technique 44 returns to STEP 52 for continued monitoring of the SOC/voltage of the on-board energy storage system. Once the recharging power supplied to the on-board energy storage system by the charging device is sufficient to bring the SOC/voltage back within the pre-determined acceptable range (as determined at STEP 54), the charging device is then deactivated at STEP 57. The technique 44 thus provides for controlled operation of the vehicle-based UPS based on the determining of a SOC/voltage of the on-board energy storage system and based on the selective operation of the charging device to supply the recharging power to the on-board energy storage system to maintain the SOC/voltage of the on-board energy storage system within a pre-determined range.

Figure 3:
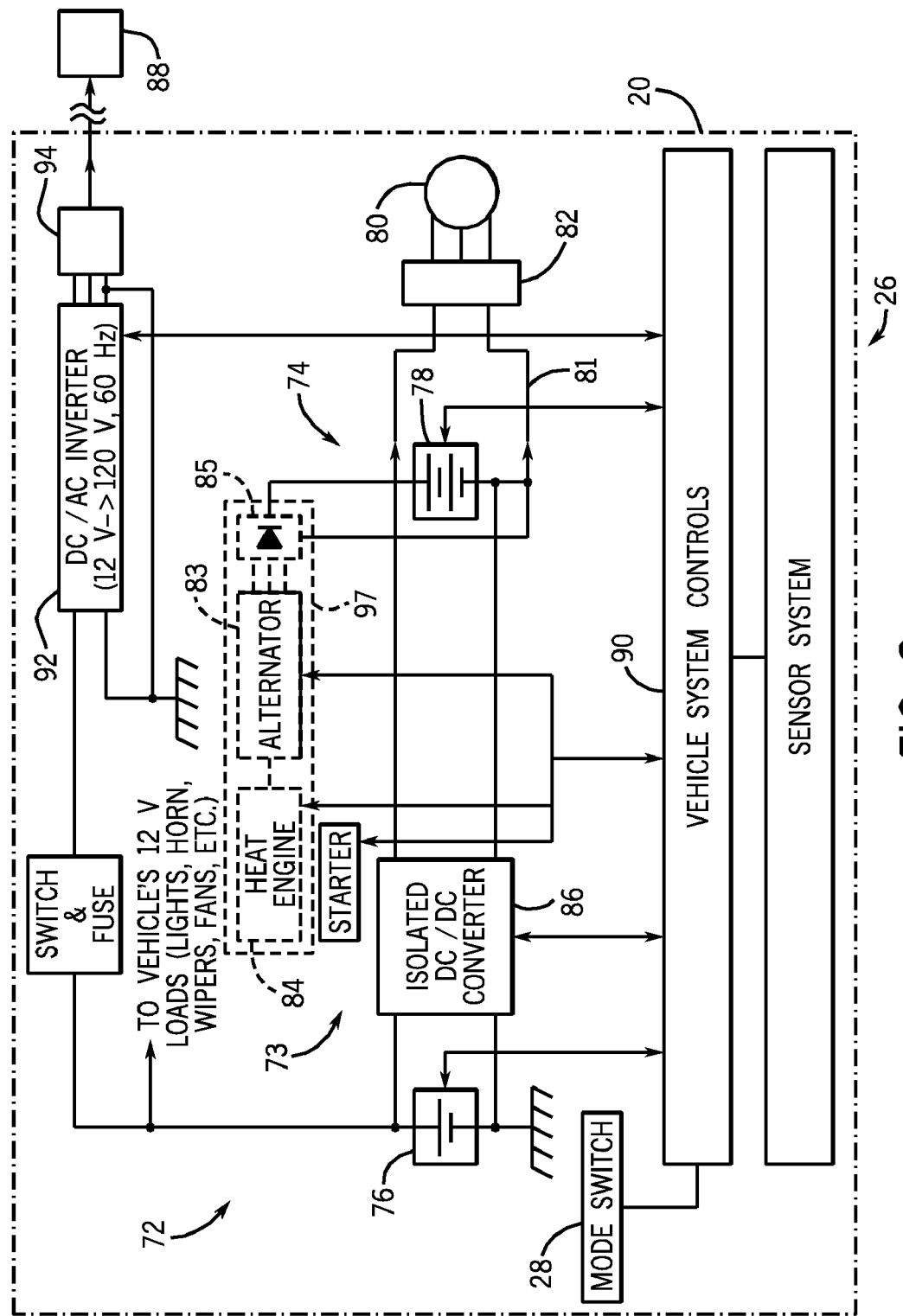
FIG. 3 is a block schematic diagram of a vehicle-based UPS according to one embodiment of the invention.

Referring now to FIG. 3, a vehicle-based UPS 72 is shown as incorporated into a BEV AC propulsion system, according to one embodiment of the invention. The vehicle-based UPS 72 includes an on-board energy storage system 74 included on the vehicle 20 in the form of a 12 V Starting Lighting and Ignition (SLI) battery 76 and high voltage traction battery 78 (e.g., 300 V nominal). The high voltage traction battery 78 supplies power to an electric motor 80 to drive the motor, and is coupled thereto by way of a DC link 81 and a traction inverter 82, which transfers AC power to the motor 80 based on an external torque command. Provided the mode switch 28 is in position for normal driving, and in response to a torque command based on an operator command, high voltage traction battery 78 provides power to drive the electric motor 80.

Also included in the vehicle-based UPS 72 is an on-board charging device 73 (i.e., charging unit) that is coupled to the on-board energy storage system 74 to provide a recharging power thereto. As shown in FIG. 3, the charging device 73 includes an isolated DC-DC converter 86 connected between the SLI battery 76 and the high voltage traction battery 78. When activated, DC-DC converter 86 allows for a transfer of recharging power from high voltage traction battery 78 to the SLI battery 76 and conditions the power to provide a proper charge to the SLI battery. That is, DC-DC converter 86 receives a DC power from high voltage traction battery 78 and conditions the power for transfer to the SLI battery 76 to provide charge thereto. Thus, upon activation of DC-DC converter 86, high voltage traction battery 78 can provide power to SLI battery 76 to recharge the SLI battery as it is drained due to its providing power to an external load 88 connected to the vehicle-based UPS 72. To transfer and condition power from the SLI battery 76 to the external load 88, a DC-AC inverter 92 and power receptacle 94 are included in vehicle-based UPS 72. The DC-AC inverter 92 receives a DC power from the SLI battery 76 and inverts the DC power to an AC power useable by the external load 88. Power receptacle 94 then allows for connection of the external load 88 to the vehicle-based UPS 72.

When the vehicle 20 is not running, and power is being supplied to the external load 88 from the vehicle-based UPS 72, the SOC/voltage of the high voltage SLI battery 76 will begin to decline and will eventually fall below a pre-determined acceptable amount (i.e., fall outside an acceptable range), To determine when a transfer of power from the high voltage traction battery 78 to SLI battery 76 is desired (as provided by DC-DC converter 86), a control system 90 in vehicle-based UPS 72 is configured to sense a SOC/voltage of the SLI battery 76. If the SOC/voltage of the SLI battery 76 is outside an acceptable range, control system 90 activates the DC-DC converter 86 to transfer energy from the high voltage traction battery 78 to recharge the SLI battery 76 and maintain proper SOC/voltage on the SLI battery 76 to continue to supply power to either internal or external loads. More specifically, when control system 90 is switched to an "Emergency Power" mode and when a sensed SOC/voltage of the SLI battery 76 is outside an acceptable range, control system 90 is configured to activate DC-DC converter 86 to transfer energy from the high voltage traction battery 78 to the SLI battery 76 to supply a recharging power thereto. Control system 90 continues to measure the SOC/voltage of the SLI battery 76 as power is being transferred thereto by the DC-DC converter 86 and high voltage traction battery 78. Thus, when the SOC/voltage of the SLI battery 76 is raised back into the acceptable range, control system 90 acts to deactivate DC-DC converter 86, to terminate transfer of power from the high voltage traction battery 78. In such a manner, control system 90 thus ensures that the SLI battery 76 is not operated outside its normal range of SOC/voltage due to the supply of power to the external load 88. Battery life of SLI battery 76 will thus not be degraded based on operation of the external load 88.

Beneficially, in a propulsion system for a BEV, the capacity and energy storage rating of the high voltage traction battery 78 is significantly higher than the high voltage traction battery in a HEV. For example, today's HEVs may have a high voltage traction battery with total energy rating of 1-2 kWh, while a high voltage traction battery in a propulsion system for an EV may have total energy rating in excess of 15 kWh. Thus, the vehicle-based UPS 72 in a BEV is expected to remain operational (i.e., SOC/voltage of the on-board energy storage system remains within an acceptable range) for a duration of time that is sufficient for the UPS 72 to operate critical medical equipment or other external devices/loads.

Also shown in FIG. 3, in phantom, is an auxiliary power unit (APU) 97 that, according to another embodiment of the invention, is included in the propulsion system for the vehicle-based UPS 72 when the propulsion system is based on a Hybrid Electric Vehicle (HEV) AC propulsion system. The APU 97 forms part of the charging device 73 (along with DC-DC converter) to supply additional recharging power to the on-board energy storage system 12. The APU 97 includes therein an internal combustion engine 84, along with an alternator 83 and diode-rectifier device 85 connected to the engine 84 to condition the recharging power provided by combustion engine and convert the recharging power to a DC power. Provided the mode switch 28 is in position for normal driving and in response to a torque command, based on an operator command, combustion engine 84 provides supplemental DC power to high voltage traction battery 78 to drive the electric motor 80.

As set forth above, when the vehicle 20 is not running, and power is being supplied to the external load 88 from the vehicle-based UPS 72, the SOC/voltage of the on-board energy storage system 74 begins to decline. In addition to SLI battery 76 being drained, high voltage traction battery 78 will also begin to decline and will eventually fall below a predetermined acceptable amount (i.e., fall outside an acceptable range), based on its selective supplying of power to SLI battery 76. When such a drop in the SOC/voltage of the high voltage traction battery 78 occurs, control system 90 in vehicle is further configured to selectively activate the APU 97 (i.e., activate the internal combustion engine 84) to recharge the high voltage traction battery 78 (and the SLI battery 76). More specifically, when control system 90 is switched to an "Emergency Power" mode and when a sensed SOC/voltage of the high voltage traction battery 78 is outside an acceptable range, control system 90 is configured to activate internal combustion engine 84 to supply a recharging power thereto. Control system 90 continues to measure the SOC/voltage of the high voltage traction battery 78 as power is being transferred thereto by internal combustion engine 84. Thus, when the SOC/voltage of the high voltage traction battery 78 is raised back into the acceptable range, control system 90 acts to deactivate internal combustion engine 84. Thus, by selectively activating the DC-DC converter 86 and the APU 97, control system 90 ensures that the respective batteries (SLI battery 76 and high voltage traction battery 78) are not operated outside their normal range of SOC/voltage due to the supply of power to the external load 88. Battery life of SLI battery 76 and high voltage traction battery 78 will thus not be degraded based on operation of the external load 88.

Figure 4:
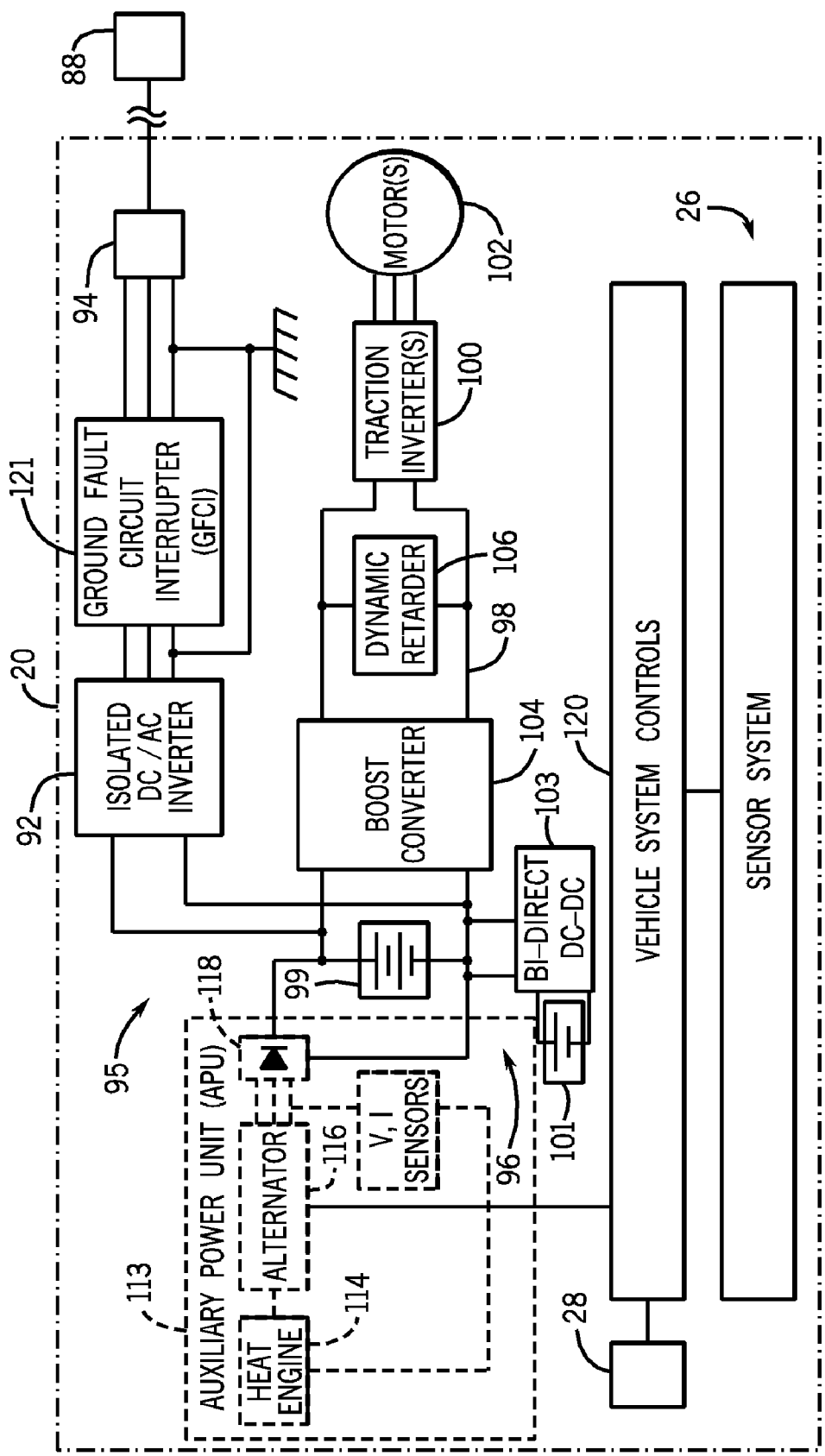
FIG. 4 is a block schematic diagram of a vehicle-based UPS according to another embodiment of the invention.
Figure 5:
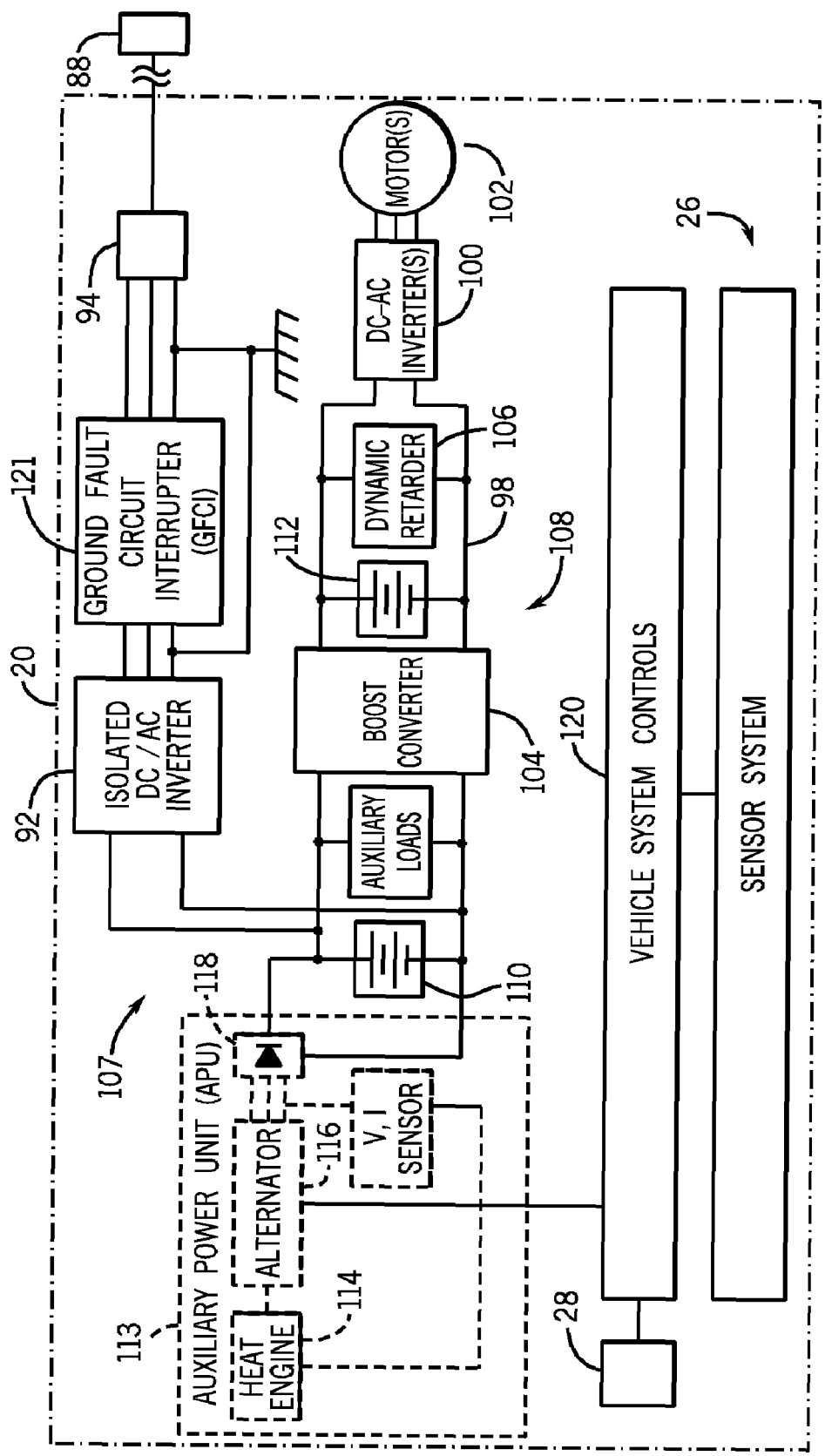
FIG. 5 is a block schematic diagram of a vehicle-based UPS according to another embodiment of the invention.

Additional embodiments of vehicle-based UPS are shown in FIGS. 4 and 5 and incorporate on-board energy storage systems on a vehicle 20 as described in detail in U.S. Pat. No. 7,049,792 to King. As shown in FIG. 4, a vehicle-based UPS 95 is based on a Battery Electric Vehicle (BEV) AC propulsion system, where an on-board energy storage system 96 includes a high energy density battery 99, which, according to the embodiment, is an electrically rechargeable battery. High energy density battery 99 can be formed as, for example, a sodium-metal-halide battery having an energy density of 120 W-hr/kg, or possibly a lithium-ion battery with energy density of 110 W-hr/kg. High energy density battery 99 is coupled to a DC link 98 that connects to a traction inverter 100 and a motor 102. A boost converter circuit 104 is positioned on the DC link 98 between high energy density battery 99 and motor 102 to boost the voltage available from the electrically rechargeable high energy density battery 99. A dynamic retarder 106 is coupled across the DC link 98 on the inverter 100 end of the link and is operated to limit the DC voltage developed on DC link 98 when the motor 102 is operated in a regenerative mode returning electric power to the link through the inverter 100 when the on-board energy storage units are not able to accept the level of regenerative power being developed by the motor 102 to the link through the inverter 100.

Also included in the on-board energy storage system 96 is a SLI battery 101. Connected between the high energy density battery 99 and the SLI battery 101 is a charging device 103 in the form of an isolated, bi-directional DC-DC converter. When activated, the bi-directional DC-DC converter 103 allows for a transfer of recharging power from SLI battery 101 to the high energy density battery 99. When the vehicle 20 is not running, and power is being supplied to the external load 88 from the vehicle-based UPS 95, the SOC/voltage of the high energy density battery 99 will begin to decline and will eventually fall below a pre-determined acceptable amount (i.e., fall outside an acceptable range). To determine when a transfer of power from the SLI battery 101 to high energy density battery 99 is desired (as provided by DC-DC converter 103), control system 120 in vehicle-based UPS 95 is configured to sense a SOC/voltage of the high energy density battery 99. If the SOC/voltage of the high energy density battery 99 is outside an acceptable range, control system 120 activates the bi-directional DC-DC converter 103 to transfer energy from the SLI battery 101 to recharge the high energy density battery 99 and maintain proper SOC/voltage therein.

According to another embodiment of the invention, and as shown in FIG. 5, a vehicle-based UPS 107 includes an on-board energy storage system 108 in the form of a hybrid battery configuration and is based on a BEV propulsion system. The hybrid battery configuration 108 includes a high energy density battery 110, such as a sodium-metal-halide battery having an energy density of 120 W-hr/kg, or possibly a lithium-ion battery with energy density of 110 W-hr/kg, and a high power density battery 112, such as a nickel cadmium battery having a power density in excess of 350 W/kg, or a lithium-ion battery having a power density in excess of 1,000 W/kg, across the DC link 98 on the inverter 100 side of the boost converter 104. The hybrid battery configuration 108 provides high power response for acceleration or heavy pulsed load conditions using the high power density battery 112, while at the same time providing for extended range of operation of the vehicle using the high energy density battery 110. In this embodiment, when the motor 102 is used to effect electrical retarding of the vehicle 20, the regenerative energy produced by the motor 102 can be transferred to both the high power density battery 112 and the high energy battery through the bi-directional boost converter 104 to effectively recharge the on-board batteries and extend the operating range of the vehicle 20. Preferably, the terminal voltage of the high energy density battery 110 is less than the terminal voltage of the high power density battery 112 so that without the boost converter 104, there would be no power flow from the battery 110 to the battery 112. This allows the boost converter 104 to be controlled in a manner to regulate the amount of energy drawn from or supplied to the high energy density battery 110. Energy will be drawn from high energy density battery 110 either when power demand by the motor 102 is greater than can be supplied by high power density battery 112 or when the energy is needed to recharge high power density battery 112 from high energy density battery 110, or a combination of power from each battery 110, 112 depending on the specific control algorithm.

In the BEV configuration shown in FIG. 5, when the vehicle 20 is not running and power is being supplied to the external load 88 from the vehicle-based UPS 107, the bi-directional boost converter 104 also acts as a charging device to allow for a transfer of recharging power from high power density battery 112 to the high energy density battery 110. That is, as power is being supplied to the external load 88 from the vehicle-based UPS 107 and the SOC/voltage of the high energy density battery 110 begins to decline and approach a pre-determined SOC/voltage threshold, the bi-directional boost converter 104 can be activated to allow for a transfer of recharging power from high power density battery 112 to the high energy density battery 110. To determine when a transfer of power from the high power density battery 112 to the high energy density battery 110 is desired, control system 120 in vehicle-based UPS 107 is configured to sense a SOC/voltage of the high energy density battery 110. If the SOC/voltage of the high energy density battery 110 is outside an acceptable range, control system 120 activates the bi-directional boost converter 104 to transfer energy from the high power density battery 112 to recharge the high energy density battery 110 and maintain proper SOC/voltage therein.

According to additional embodiments of the invention, each of the vehicle-based UPSs 95, 107 of FIGS. 4 and 5 may be based on/incorporated into an HEV AC propulsion system, and thus may contain an additional charging device 113 in the form of an APU, as shown in phantom in FIGS. 4 and 5. The APU 113 includes a combustion engine 114 that is connected to the on-board energy storage system 96, 108 (i.e., high energy density battery 99, 110) to provide a recharging power thereto. An alternator 116 and diode-rectifier device 118 are included to condition the recharging power provided by combustion engine 114 and convert the recharging power to a DC power. The recharging power provided by combustion engine 114 is transmitted to high energy density battery 99, 110 to increase a SOC/voltage therein. The control system 120 in vehicle 20 is configured to selectively activate internal combustion engine 114 to recharge the high energy density battery 99, 110. More specifically, when control system 120 is switched to an "Emergency Power" mode and when a sensed SOC/voltage of the high energy density battery 99, 110 is determined to be outside an acceptable range, control system 120 is configured to activate internal combustion engine 114 to supply a recharging power thereto. Control system 120 continues to measure the SOC/voltage of the high energy density battery 99, 110 as power is being transferred thereto by internal combustion engine 114. Thus, when the SOC/voltage of the high energy density battery 99, 110 is raised back into the acceptable range, control system 120 acts to deactivate internal combustion engine 114, and stored energy from the high energy density battery 99, 110 is again used to power the external load 88. While APU 113 is described above as providing recharging power to high energy density battery 99, 110, it is also understood that recharging power is also provided to SLI battery 101 (FIG. 4) and high power density battery 112 in the on-board energy storage systems 96, 108. Control system 120 thus functions to maintain SOC/voltage of the on-board energy storage system 96, 108 within its normal range during the supply of power to the external load 88.

The embodiments of the vehicle-based UPS 95, 107 shown in FIGS. 4 and 5 are capable of storing increased amounts of energy in on-board energy storage system 96, 108. Thus, the vehicle-based UPS 95, 107 is designed to have an increased power rating and to be used to power more demanding (i.e., higher powered) external loads. Thus, vehicle-based UPS 95, 107 includes therein a ground fault current interrupter (GFCI) circuit 121 to terminate power output from the vehicle-based UPS when appropriate.

Figure 6:
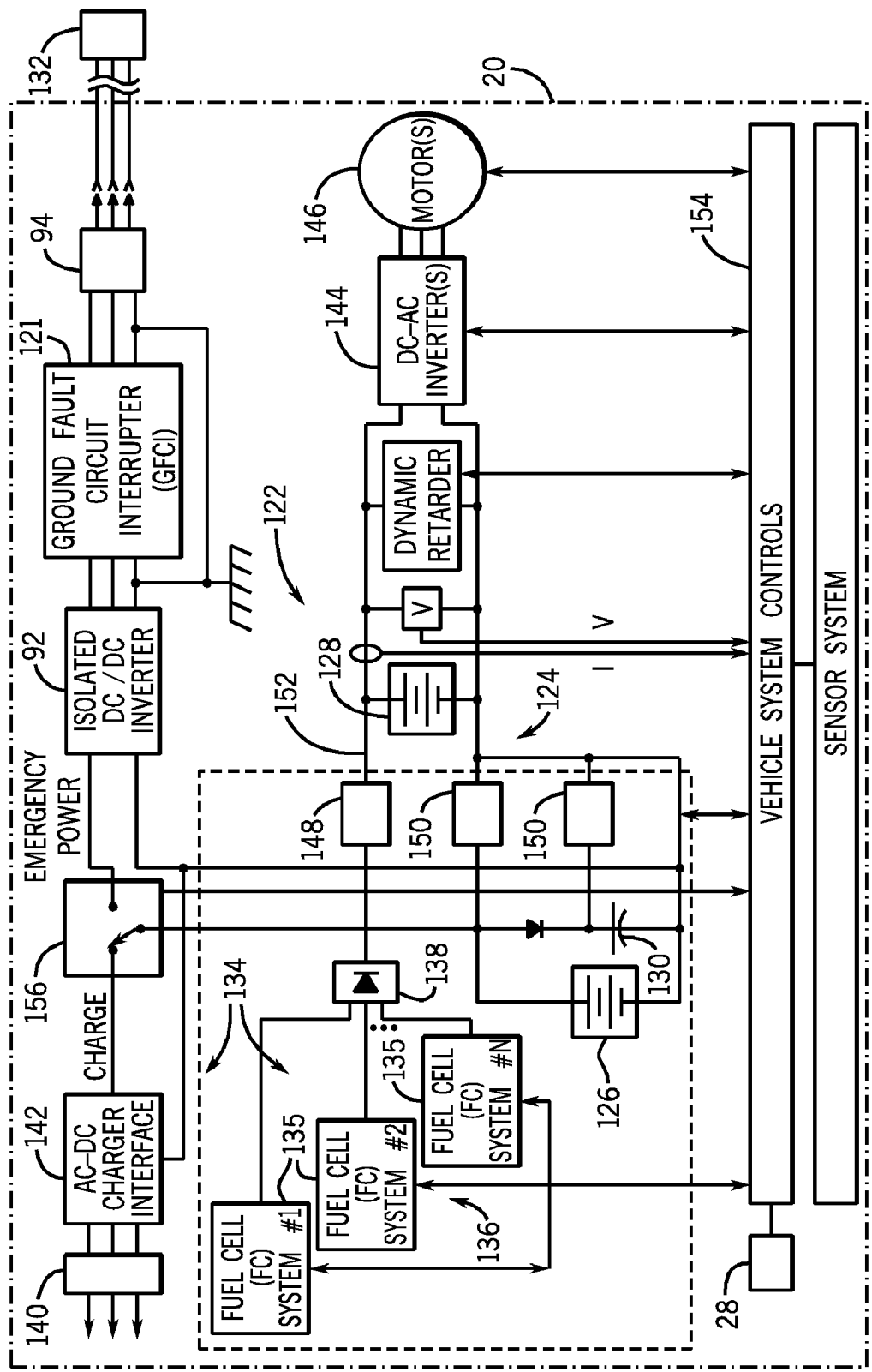
FIG. 6 is a block schematic diagram of a vehicle-based UPS according to another embodiment of the invention.

Referring now to FIG. 6, a vehicle-based UPS 122 is shown as incorporated into a Plug-In Hybrid Vehicle (PHEV) propulsion system according to another embodiment of the invention. An on-board energy storage system 124 of vehicle-based UPS 122 includes multiple on-board energy storage units, which include a high-specific energy battery 126 (e.g., a sodium metal halide battery having an energy density of 120 W-hr/kg, or a lithium-ion battery having an energy density of 110 W-hr/kg) and a high-specific power battery 128 (e.g., a nickel cadmium battery having a power density of 350 W/kg or greater, or a lithium-ion power battery having a power density of 1,000 W/kg or higher). Additionally, on-board energy storage system 124 includes one or more ultracapacitor energy storage devices 130. The ultracapacitor storage device(s) 130 provides increased power storage in on-board energy storage system 124, thus allowing for vehicle-based UPS 122 to provide higher pulsed power to an external load 132 and operate for longer periods of time without engaging a charging device 134 in the vehicle-based UPS 122 for providing recharging power.

As shown in FIG. 6, the charging device 134 of a propulsion system for vehicle-based UPS 122 includes a plurality of auxiliary power units (APUs) for generating energy. That is, as one mechanism for providing recharging power to on-board energy storage system 124, charging device 134 includes one or more fuel cells 135 forming a fuel cell assembly 136. In an exemplary embodiment, the fuel cell assembly 136 is formed of a plurality of hydrogen fuel cells 135 that generate power. Beneficially, operation of the hydrogen fuel cell assembly 136 produces heat and water vapor and does not produce carbon monoxide emissions, as do the gasoline and diesel fueled APU's in other embodiments of the invention. The power generated by the fuel cell assembly 136 is conditioned by diode-rectifier device 138 before being transferred to high-specific energy battery 126 and/or ultracapacitor storage device(s) 130 to provide recharging power thereto. As another mechanism for providing recharging power to on-board energy storage system 124, charging device 134 includes a plug-in 140 that allows for connection of the vehicle-based UPS 122 to a utility grid. When vehicle 20 is not in operation (and the utility grid is operable), the plug-in 140 can be connected to a utility grid to receive AC power therefrom. The AC power from the utility grid is passed through an AC-DC charger interface 142 (i.e., a voltage and current controlled rectifier) to condition the power for transfer to the on-board energy storage system 124. The power received through plug-in 140 from the utility grid is supplied to recharge on-board energy storage system 124.

To provide power to a traction inverter 144 and motor 146 and propel the vehicle 20 in a normal (i.e., "Run") mode of operation, power from fuel cell assembly 136 may be transmitted to one or more boost converters 148 and power from high specific energy battery 126 and ultracapacitor storage device(s) 130 is transmitted to a plurality of bi-directional buck/boost converters 150 coupled thereto. The boost converter 148 and the plurality of bi-directional buck/boost converters 150 are coupled to a DC link 152, and, in operation, the boost converter 148 boosts the voltage from the fuel cell assembly 136 and supplies the boosted voltage to DC link 152. When necessary, the plurality of bi-directional buck/boost converters 150 boosts the voltage from the high-specific energy battery 126 and ultracapacitor storage device(s) 130 and supplies the boosted voltage to DC link 152. The level to which the fuel cell voltages are boosted, as well as the level to which the energy storage device voltage is boosted depends on the manner in which the plurality of bi-directional buck/boost converters 150 and the boost converter 148 are controlled. In combination with the boosted voltages from the fuel cell assembly 136, the high-specific energy battery 126, and the ultracapacitor storage device(s) 130, voltage from the high-specific power battery 128 is used as needed to provide controlled power to traction inverter 144 and motor 146 coupled in driving relationship to wheels of the vehicle 20 or mechanical load for selected applications as part of the propulsion system.

A control system 154 is also included in vehicle-based UPS 122 and is configured to monitor and control operation of the on-board energy storage system 124 and charging device 134. When vehicle-based UPS 122 is set to an Emergency Power mode, as determined by a mode switch 28 setting, control system acts to flip a power switch 156 in vehicle-based UPS 122. Power switch 156 is switched from a setting allowing power transfer from a utility grid to on-board energy storage system 124 (through plug-in 140) to a setting (i.e., Emergency Power mode) in which vehicle-based UPS 122 provides power to an external load 132.

In addition to switching of the vehicle-based UPS 122 to Emergency Power mode, control system 154 also functions to selectively activate fuel cell assembly 136 to recharge the on-board energy storage system 124. Control system 154 measures a SOC/voltage of the on-board energy storage system 124 (i.e., high-specific energy battery 126, high-specific power battery 128, and ultracapacitor energy storage device(s) 130) via a SOC/voltage sensor 34 (FIG. 1) and determines whether the SOC/voltage is outside an acceptable pre-determined range. If the measured SOC/voltage is determined to be outside an acceptable pre-determined range, control system 154 generates a command to activate fuel cell assembly 136 to supply a recharging power to the on-board energy storage system 124. Control system 154 continues to measure the SOC/voltage of the on-board energy storage system 124 as power is being transferred thereto by fuel cell assembly 136. Thus, when the SOC/voltage of the on-board energy storage system 124 is raised back into the acceptable range, control system 154 acts to shut-down/deactivate fuel cell assembly 136. Control system 154 thus functions to maintain SOC/voltage of the on-board energy storage system 124 within its normal range during the supply of power to the external load 132.

While various embodiments of on-board energy storage system and charging devices are shown and described in FIGS. 3-6, it is envisioned that other forms and configurations of on-board energy storage system and charging devices can also be included in the vehicle-based UPS. For example, an on-board energy storage system as set forth in U.S. Pat. No. 5,373,195 to King (i.e., high voltage traction battery and boost converter combination) could also be implemented in the vehicle-based UPS according to another embodiment of the invention. According to embodiments of the invention, the control system, and the technique implemented thereby as shown and described with respect to FIG. 2, is configured to monitor and control operation of the various embodiments of on-board energy storage system and charging device (e.g., DC-DC converters and APUs) to provide a source of uninterruptable power to external loads.

A technical contribution for the disclosed method and apparatus is that is provides for a controller implemented technique for controlling operation of a propulsion system for a vehicle-based UPS. The control system controls operation of an on-board energy storage system and on-board charging device(s), so as to provide uninterruptable power to an external load and maintain a voltage and/or state-of-charge (SOC) of the on-board energy storage system within an acceptable range.

Therefore, according to one embodiment of the invention, a vehicle-based uninterruptable power supply (UPS) system includes an energy storage system located on-board a vehicle and configured to generate DC power transferable to an external load and an DC-AC inverter connected to the on-board energy storage system to receive the DC power therefrom and invert the DC power to an AC power useable by the external load. The vehicle-based UPS also includes a charging device located on-board the vehicle and connected to the on-board energy storage system to provide a recharging power thereto and a control system. The control system is configured to determine one of a state-of-charge (SOC) and a voltage of the energy storage system and selectively operate the charging device to provide the recharging power to the energy storage system to maintain the one of the SOC and the voltage of the energy storage system within a pre-determined range.

According to another embodiment of the invention, a method for supplying uninterruptable power includes the steps of detecting connection of an external load to an on-board energy storage system of a vehicle and providing power from the on-board energy storage system to the external load upon connection thereto. The method also includes the steps of detecting one of a voltage and a state of charge (SOC) of the on-board energy storage system and, if the one of the voltage and the SOC of the on-board energy storage system is below a pre-determined threshold, then activating a charging unit connected to the on-board energy storage system to supply a recharging power thereto and maintain the one of the SOC and the voltage of the on-board energy storage system within a pre-determined range.

According to yet another embodiment of the invention, a control system for controlling the supply of uninterruptable power from a vehicular on-board energy storage system to an external load is programmed to detect connection of an external load to an on-board energy storage system of a vehicle and measure one of a voltage and a state of charge (SOC) of the on-board energy storage system upon connection of the external load. The control system is further programmed to activate a charging device connected to the on-board energy storage system to supply a recharging power thereto if the one of the voltage and the SOC of the on-board energy storage system is outside a pre-determined range and deactivate the charging device if the one of the voltage and the SOC of the on-board energy storage system is within the pre-determined range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle-based uninterruptable power supply (UPS) system comprising:
   an energy storage system located on-board a vehicle, the energy storage system configured to provide electric power for at least one of driving an electric motor of the vehicle and powering auxiliary devices of the vehicle and to also generate DC power transferable to an external load;
   an DC-AC inverter connected to the on-board energy storage system to receive the DC power therefrom and invert the DC power to an AC power useable by the external load;
   a charging device located on-board the vehicle and connected to the on-board energy storage system to provide a recharging power thereto; and
   a control system configured to:
      cause the energy storage system to provide power transferable to the external load by way of the DC-AC inverter;
      determine one of a state-of-charge (SOC) and a voltage of the energy storage system while the energy storage system is providing power to the external load; and
      selectively operate the charging device to provide the recharging power to the energy storage system to maintain the one of the SOC and the voltage of the energy storage system within a pre-determined range while still providing power to the external load, such that the energy storage system provides uninterruptable power to the external load.

2. The vehicle-based UPS of claim 1 wherein the energy storage system comprises:
   a starting-lighting-ignition (SLI) battery; and
   a high voltage traction battery coupled to the SLI battery.

3. The vehicle-based UPS of claim 2 wherein the charging device comprises a DC-DC converter connected between the SLI battery and the high voltage traction battery and configured to selectively provide the recharging power from the high voltage traction battery to the SLI battery.

4. The vehicle-based UPS of claim 1 wherein the energy storage system comprises:
   a high energy density battery;
   a boost converter coupled to the high energy density battery to selectively boost the voltage from the high energy density battery to drive an AC motor of the vehicle; and
   a starting-lighting-ignition (SLI) battery coupled to the high energy density battery.

5. The vehicle-based UPS of claim 4 wherein the charging device comprises a bi-directional DC-DC converter connected between the SLI battery and the high energy density battery and configured to selectively provide the recharging power from the SLI battery to the high energy density battery.

6. The vehicle-based UPS of claim 1 wherein the energy storage system comprises a hybrid battery assembly comprising:
   a high specific-energy battery; and
   a high specific-power battery connected to the high specific-energy battery.

7. The vehicle-based UPS of claim 6 wherein the charging device comprises a bi-directional boost converter coupled between the high specific-energy battery and the high specific-power battery, the bi-directional boost converter configured to selectively boost the voltage from the high specific energy battery to drive an AC motor of the vehicle and selectively provide the recharging power from the high specific-power battery to the high specific energy battery.

8. The vehicle-based UPS of claim 6 wherein the energy storage system further comprises at least one ultracapacitor connected to the high specific energy battery.

9. The vehicle-based UPS of claim 1 wherein the charging device comprises an auxiliary power unit (APU).

10. The vehicle-based UPS of claim 9 wherein the APU comprises one of a combustion engine and a fuel cell assembly connected to the energy storage system to provide the recharging power thereto.

11. The vehicle-based UPS of claim 9 wherein the APU comprises a plug-in device configured to connect the energy storage system to a utility grid to provide the recharging power thereto.

12. The vehicle-based UPS of claim 1 wherein the control system further comprises a sensor system configured to sense at least one vehicle-related parameter; and wherein the control system is further configured to disable operation of the charging device if the at least one sensed vehicle-related parameter is in an undesired state.

13. The vehicle-based UPS of claim 12 wherein the at least one vehicle-related parameter comprises one of a carbon monoxide level, a fuel level, a parking brake engagement status, and a ground fault current interrupt (GFCI) connection status.

14. The vehicle-based UPS of claim 1 wherein the control system is further configured to deactivate an inverter-traction motor combination to prevent torque generation at wheels of the vehicle.

15. The vehicle-based UPS of claim 1 further comprising a mode switch configured to switch an operational mode of the control system.

16. A method for supplying uninterruptable power comprising:

detecting connection of an external load to an on-board energy storage system of a vehicle, the energy storage system being configured to provide electric power for at least one of driving an electric motor of the vehicle and powering auxiliary devices of the vehicle and to also generate power transferable to the external load;

providing power from the on-board energy storage system to the external load upon connection thereto;

detecting one of a voltage and a state of charge (SOC) of the on-board energy storage system; and if the one of the voltage and the SOC of the on-board energy storage system is below a pre-determined threshold, then activating an on-board charging unit of the vehicle connected to the on-board energy storage system to supply a recharging power thereto and maintain the one of the SOC and the voltage of the on-board energy storage system within a pre-determined range while the on-board energy storage system provides power to the external load;

otherwise, if the one of the voltage and the SOC of the on-board energy storage system is above the pre-determined threshold, then keeping the on-board charging unit of the vehicle in a non-activated state while the on-board energy storage system is providing power to the external load.

17. The method of claim 16 wherein activating the charging unit comprises activating one of a DC-DC converter, a bi-directional DC-DC converter, and a bi-directional boost converter.

18. The method of claim 16 wherein activating the charging unit comprises activating an auxiliary power unit (APU), the APU comprising one of a combustion engine and a fuel cell arrangement.

19. The method of claim 16 further comprising:
sensing at least one vehicle-related parameter; and
disabling operation of the charging unit if the at least one sensed vehicle-related parameter is in an undesired state.

20. The method of claim 16 further comprising actuating a switch on the vehicle to deactivate an inverter-traction motor combination in the vehicle and prevent torque generation at wheels of the vehicle during provision of the power to the external load.

21. A control system for controlling the supply of uninterruptable power from a vehicular on-board energy storage system to an external load, the control system programmed to:

detect connection of an external load to an on-board energy storage system of a vehicle;

measure one of a voltage and a state of charge (SOC) of the on-board energy storage system upon connection of the external load;

selectively activate a charging device connected to the on-board energy storage system to supply a recharging power thereto so as to maintain the one of the voltage and the SOC of the on-board energy storage system within a pre-determined range, wherein selectively activating the charging device comprises:

activating the charging device to supply the recharging power thereto if the one of the voltage and the SOC of the on-board energy storage system is outside the pre-determined range; and deactivating the charging device if the one of the voltage and the SOC of the on-board energy storage system is within the pre-determined range; and operate the on-board energy storage system of the vehicle to provide power to the external load while maintaining the one of the voltage and the SOC of the on-board energy storage system within the pre-determined range, such that the on-board energy storage system provides uninterruptable power to the external load.

22. The control system of claim 21 wherein activating the charging device comprises activating one of a DC-DC converter, a bi-directional DC-DC converter, and a bi-directional boost converter.

23. The control system of claim 21 wherein activating the charging device comprises activating an auxiliary power unit (APU).

24. The control system of claim 21 further programmed to:
sense at least one vehicle-related parameter; and
disable operation of the charging device if the at least one sensed vehicle-related parameter is in an undesired state.

25. The control system of claim 24 wherein the at least one vehicle-related parameter comprises one of a carbon monoxide level, a fuel level, a parking brake engagement status, and a ground fault current interrupt (GFCI) connection status.

26. The control system of claim 21 further programmed to deactivate an inverter-traction motor combination in the vehicle during activation of the charging device.

* * * * *